Figure 1:
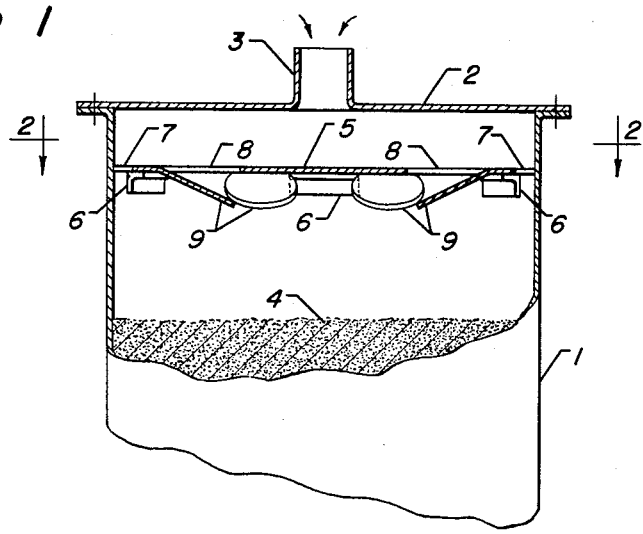

Nov. 24, 1964     H. A. SCHULZ ETAL     3,158,177

FLOW STREAM DIFFUSER MEMBER

Filed Sept. 9, 1963

INVENTORS:
Henry A. Schulz
Robert M. Nichols
BY:
ATTORNEYS

# United States Patent Office 3,158,177
Patented Nov. 24, 1964

3,158,177
FLOW STREAM DIFFUSER MEMBER
Henry A. Schulz, Arlington Heights, and Robert M. Nichols, Oak Park, Ill., assignors to Universal Oil Products Company, Des Plaines, Ill., a corporation of Illinois
Filed Sept. 9, 1963, Ser. No. 307,504
2 Claims. (Cl. 137—592)

The present invention relates to a flow stream diffuser member and more particularly to a flow stream diffuser adapted to evenly distribute a gas or vapor flow into the interior of a cylindrical form of a small reactor where the diameter of the inlet to the reactor is substantially smaller than the diameter of the reactor itself.

In effecting the catalytic treatment of a gas or vapor stream, it is desirable to obtain uniform stream flow through the bed of catalyst particles so that such particles are utilized to their maximum efficiency and in turn provide the desired treatment or conversion of the flow stream. There are many kinds of distributor means which are in use to disseminate flow from an inlet point to a contact bed, as for example various types of spray nozzles, perforate plates, etc. However, test work has shown that the usual types of nozzles or spray heads and the usual perforate or slotted plate designs do not provide a truly uniform flow into and through a confined contact bed where the fluid stream is being introduced through a single central inlet. This appears particularly true where the inlet opening is of substantially smaller diameter than the internal diameter of the reactor.

It is thus a principal object of the present invention to provide a diffuser plate design having special flow stream openings and deflectors to effect uniform flow to the top of the contact zone.

Briefly, the present improved diffuser device for use in distributing a gaseous flow stream from a single central inlet port to a larger cross sectional area contact zone, comprises in combination, a transverse flat plate section sized to connect with and traverse the cross sectional area of the inlet end of the contact zone, a non-perforate center portion for said plate section, narrow open slot means adjacent the periphery of such plate section and providing thereby inlet stream flow inwardly along the inside wall portion of the contact zone, a plurality of inlet openings through the plate section in a spaced symmetrical annular pattern around the non-perforate center portion and a flow stream deflector member sloping away from the outer downstream edge of each of the spaced inlet openings, with each of said deflector members thus sloping in a downstream direction toward an axis that is normal to the center of the diffuser plate section and of the contact zone, whereby there is opposing downstream angular gaseous stream flow through each of the spaced inlet openings to the contact zone.

The size of the narrow slot means adjacent the periphery of the diffuser device as well as the size of the plurality of inlet openings through the plate section thereof will vary in accordance with the overall dimensions of the diffuser member itself and the contact zone which the gas flows downstream therefrom. However, it appears that the area of the inlet openings and the slot means will generally comprise about one-third (⅓) of the area of the diffuser flat plate itself. A diffuser member of the present design will usually be utilized in combination with a substantially cylindrical form contact zone and the spaced inlet openings through the flat plate section may have a substantially circular cross section configuration. However, the broad design may be utilized in combination with other tubular forms of contact zones which may be oval or of polygonal cross section. In all cases, however, the deflector members slope away from the flat plate section on the downstream side of the device and toward the contact zone itself such that they receive the stream flow and deflect it toward the center portion of the unit. The spaced inlet openings, together with accompanying spaced deflector members, in turn provide a resulting divided and deflected gas stream flow, with each of the separate deflected streams meeting in a diffused flow in the center portion of the unit to provide a substantially uniform downward gas flow to the upstream end of the contact bed of the zone.

It is not understood fully why the particular improved design provides the uniform downstream flow through the contact zone other than by reason of the opposing stream flow meeting along the central axis and diffusing downstream therefrom in combination with smaller downstream flow from the narrow openings around the periphery of the diffusion device and along the side of the interior wall of the contact zone; however, as will be pointed out more fully hereinafter the arrangement provides for greater uniform flow than may be obtained from conventional gas or vapor distributing members.

Referring to the accompanying drawing and the following description in connection therewith will serve to further clarify the design and arrangement of the diffuser unit in combination with a particle contacting zone.

FIGURE 1 of the drawing is a diagrammatic sectional elevational view indicating an improved diffuser device positioned across the upper inlet end of a cylindrical form particle contacting zone.

Figure 2:
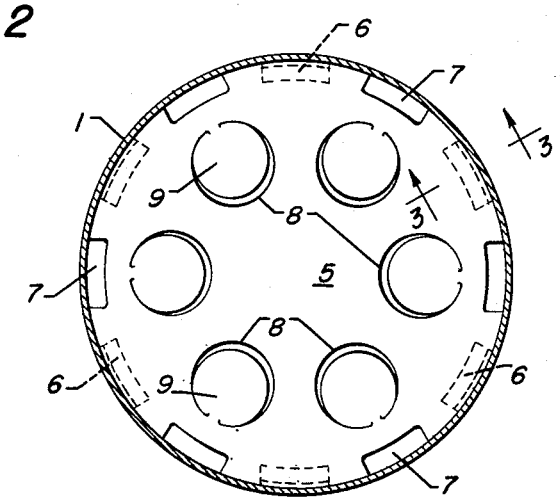

FIGURE 2 of the drawing is a sectional plan view, as indicated by line 2—2 in FIGURE 1.

Figure 3:
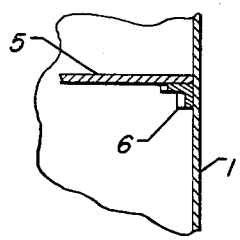

FIGURE 3 of the drawing is a partial sectional view indicating an angular support member under the edge of the flat plate section of the diffuser, as indicated by the line 3—3 in FIGURE 2.

Referring now specifically to the drawing, there is indicated a contacting chamber 1 having an upper inlet end 2 with an inlet port 3. Such chamber is adapted to hold a bed of catalyst or other contact particles 4 for treating or converting a stream being introduced by way of inlet port 3 and will have a suitable treated stream outlet port, not shown, that is downstream from the bed 4. In effecting catalytic conversions or other particle contacting operations, it is frequently desirable to utilize a relatively thin wide bed of particles in order to preclude high pressured drops for the flow stream and at the same time obtain rapid intimate contact with the particles for an efficient conversion. As a result, the cross sectional area of the contact zone may be large as compared to the cross sectional area of the inlet line or port which introduces the fluid stream into the zone for contact with the particle bed. One or more layers of inert particles, distributing screens or plates are frequently used upstream from a catalyst bed in order to assist in obtaining a uniform introduction of the charge stream to the extended surface of the catalyst bed; however, as indicated hereinbefore, there may be channeling or non-uniform flow which will preclude maximum efficiency with the use of a minimum amount of catalyst particles.

In accordance with the present invention, a flat diffuser plate section 5 is supported a spaced distance below the inlet 3 to the contact chamber 1, as well as spaced above the inlet end of the packed bed 4 such that there may be diffusion of the inlet fluid stream and uniformity of flow to the bed 4. The plate section 5 is indicated as being supported within chamber 1 by a plurality of angle-form support members 6 spaced around the inside wall of the chamber 1. The support means is not continuous in the present embodiment by reason of the provision of a plurality of spaced narrow slots 7 which are in turn spaced around the periphery of the plate section 5 and adjacent the inside wall of chamber 1. Such slots serve to provide a substantially straight downward flow of a portion of the inlet stream to the annular portion of the contact zone adjacent the inside wall thereof. Preferably the narrow slot area comprises only a minor portion of open area through plate 5 and may comprise from about 2.0 percent to 5.0 percent of the plate area itself.

The major portion of the stream flow is through a plurality of openings 8 which are spaced symmetrically around an intermediate annular portion of the plate 5 such such that the actual central portion of the latter is non-perforate and will not permit a direct straight through flow stream from a centrally positioned inlet opening, such as port 3. The present embodiment indicates six round inlet openings 8 positioned about midway between the center of the plate section and the exterior periphery thereof.

Depending below and sloping inwardly from an exterior edge of openings 8 are deflector members 9 which cause the incoming fluid stream passing through each of the separate inlet openings 8 to be deflected and diffused within the central portion of the chamber, below the flat plate section 5. Individually, each deflector member 9 is shunting the inlet stream to an opposing side portion of the contact zone; however, as a result of the plurality of spaced openings 8 and the accompanying plurality of adjacent deflector members 9 which have a uniform spaced and opposing arrangement, there is the resulting mixing and diffusing of the separated streams in the zone downstream from the diffusion plate section 5. As indicated hereinbefore, this diffusion together with an annular stream along the inside wall of the contact zone, which results from the plurality of slot openings 7, will provide substantially uniform distribution to the top of the contact bed 4.

It is not intended to limit the present improved diffusing device to the use of any predetermined number of openings 8 or any exact pattern or spacing. For example, square or rectangular openings may well be used in lieu of the round openings 8 in the drawing, as long as suitable cross sectional area is provided together with properly positioned deflector members. Similarly, the actual deflector members 9 may be made in a shape other than round, but will generally conform with the configuration of the inlet openings 8 such that there is substantially full deflection of the inlet stream through each individual spaced opening.

FIGURE 3 of the drawing shows in a partial sectional elevation view the use of supporting clips or angle members 6 at spaced points around the periphery of the diffuser plate 5 such that the latter is held in position against the incoming stream flow within the upstream end of the contact zone 1. The support members 6 are spaced between the plurality of spaced slots 7 such that stream flow through the latter is not blocked. However, it is not intended to limit the support means to specifically the use of angle supports such as 6, inasmuch as mechanical equivalents may be embodied within the scope of the present invention. For example, a hanger or other projecting flange means may be provided from the periphery of the plate section 5 to hang from or otherwise engage with the flanged inlet end portion of the chamber 1 or from the cover member 2. The holding means may actually vary in accordance with the positioning of the contact chamber and depend upon the vertical or horizontal positioning of such chamber. Where the contact zone is laying in a horizontal position, the diffuser member across the end thereof is in turn positioned in a substantially vertical position and a different form of support and holding means may be utilized as compared with the support angles or hanger means utilized in a vertically positioned contact chamber.

In a specific embodiment, an improved diffuser device has been used in combination with a cylindrical reactor chamber having a bed of oxidation catalyst particles adapted to receive and treat an engine exhaust gas stream. The cylindrical reactor has an inside diameter of 6½-inches and a central inlet port of approximately 1½-inches in diameter. The diffuser device is mounted across the inlet end of the reactor at approximately ¾ of an inch from the top of the reactor chamber and approximately 4 inches above the top of the catalyst bed. The actual diffuser design and arrangement was substantially equivalent to that shown in the accompanying drawing, having six openings of 1½-inches in diameter. Each opening had an accompanying deflector member being equivalent in design and arrangement to members 9 in the drawing, such that they slope downwardly and inwardly at a 30° angle with respect to the horizontal position of the flat plate portion of the diffuser. In addition six ⅛-inch wide by 1-inch long slotted openings, equivalent to slots 7 in the drawing, were provided around the periphery of the flat plate section.

In order to determine uniformity of flow to and through the contact bed of catalyst particles in the reactor, a thermo-anemometer instrument was utilized to traverse the area under the catalyst bed. In other words, substantially equivalent velocity measurements would be found in all positions under the catalyst bed by the anemometer, as long as the gas flow rate is substantially equivalent through all portions thereof. Conversely, where non-uniform flow through the bed exists, different readings are observed for various positions downstream of the catalyst bed as the instrument traverses the area. For the specific embodiment just described, the anemometer measurements showed uniform flow through the catalyst bed.

In an experimental operation to utilize a slotted plate as a diffuser member and attempt to obtain uniform diffusion to the top of the catalyst bed in the reactor previously described, a section of flat plate was provided above the catalyst bed. The plate had uniformly spaced slots which were approximately .049-inch by .50-inch that in turn provided approximately 50 percent inlet opening therethrough. In the test operation, utilizing a similar exhaust gas flow rate as provided for the special improved diffuser device, and checking distribution of gas flow from the downstream end of the catalyst section by the thermo-anemometer, there was found that there was a non-uniform gas flow from various portions of the catalyst bed.

In still another experimental operation, an oval or dome-shaped perforate distributing head of approximately 2-inch diameter and with uniformly spaced perforations, was utilized to disseminate the inlet gas streams at the top of the reactor section such that there would be a distributed flow at the top of the catalyst bed in the reactor. Again, utilizing the thermo-anemometer to check the velocity of the gas stream flow emanating from the downstream portion of the bed in the reactor there was found that there was a non-uniform flow through the bed.

From the foregoing experimental work it may be observed that the improved design and arrangement of the present invention provides uniform diffusion and distribution of the gas stream to a particle bed and in turn obtains uniform contacting within the reactor.

We claim as our invention:

1. A diffuser member for use in distributing a gaseous flow stream from a single inlet port to a larger cross-sectional area contact zone, such member comprising in combination,
    (a) a transverse flat plate section sized to connect with and traverse the cross-sectional area of said contact zone,
    (b) a non-perforate center portion for said plate section,
    (c) narrow open slot means adjacent the periphery of such plate section providing inlet stream flow inwardly along the inside wall of said contact zone,
    (d) a plurality of inlet openings through said plate section in a spaced symmetrical annular pattern around said non-perforate center portion thereof and
    (e) a flow stream deflector member sloping away from the outer downstream edge of each of said spaced inlet openings, with each of said deflector members sloping in a downstream direction toward an axis that is normal to the center of said diffuser plate section and of said contact zone whereby there is opposing downstream angular gaseous stream flow through each of said spaced inlet openings and a resulting diffused flow into the contact zone.

2. The apparatus of claim 1 further characterized in that each of said deflector members have a configuration similar to said inlet openings and in addition each has a surface area substantially equivalent to the adjacent upstream inlet opening.

No references cited.